United States Patent [19]

Quinn

[11] Patent Number: 4,764,082

[45] Date of Patent: Aug. 16, 1988

[54] BOTTOM HOOK CONSTRUCTION FOR FORK LIFT TRUCKS

[75] Inventor: Russell C. Quinn, Twinsburg, Ohio

[73] Assignee: Jos. Dyson & Sons, Inc., Painesville, Ohio

[21] Appl. No.: 19,503

[22] Filed: Feb. 26, 1987

Related U.S. Application Data

[63] Continuation-in-part of Ser. No. 783,486, Oct. 3, 1985, abandoned.

[51] Int. Cl.[4] .................................................. B65G 7/12

[52] U.S. Cl. .................................... 414/785; 414/607; 414/661; 414/495

[58] Field of Search ............... 414/785, 661, 495, 607, 414/608, 667, 671; 187/9 R, 9 E

[56] References Cited

U.S. PATENT DOCUMENTS

| | | | |
|---|---|---|---|
| 4,085,856 | 4/1978 | Westendorf | 414/723 |
| 4,482,286 | 11/1984 | Farmer et al. | 414/785 X |
| 4,488,422 | 12/1984 | Wolf et al. | 414/671 X |
| 4,545,720 | 10/1985 | Cochran et al. | 414/723 |
| 4,619,579 | 10/1986 | Frison | 414/607 |

FOREIGN PATENT DOCUMENTS

| | | | |
|---|---|---|---|
| 1205449 | 11/1965 | Fed. Rep. of Germany | 414/785 |
| 1530628 | 5/1967 | France | 414/785 |

*Primary Examiner*—Frank E. Werner
*Attorney, Agent, or Firm*—Frank B. Robb

[57] ABSTRACT

A fork for a fork lift truck having a blade and shank connected by a heel, with a top hook on the shank and a bottom hook near the heel, the bottom hook being constructed so as to be locked and unlocked to the carriage of a lift truck to facilitate engagement of the fork with the carrier and reduce manual effort of the operator and obviate special positioning of the fork prior to connection as is commonly required.

1 Claim, 1 Drawing Sheet

BOTTOM HOOK CONSTRUCTION FOR FORK LIFT TRUCKS

This application is a continuation-in-part of application Ser. No. 06/783,486, filed Oct. 3, 1985 now abandoned.

GENERAL DESCRIPTION AND BACKGROUND OF THE DISCLOSURE

This invention relates to forks for fork lift trucks or truck vehicles, and is directed primarily to the construction of the so-called bottom hook of a fork such as is used on these vehicles, the forks being of otherwise generally conventional form involving the shank, at the upper end of which is a top hook and the bottom hook of this invention being placed at the lower end near the heel of the fork which connects the shank with the blade and at the extremity of the blade there being the usual tip provided.

The basic improvement contemplated by this invention resides in the construction of the bottom hook and the bottom hook is arranged in order to obviate some of the problems which arise from the use of heavy forks for such fork lift trucks.

It will be readily understood that generally there are two of these forks used on each fork lift truck and while they are used in pairs, it will be obvious that the description of one will apply to the other and the advantages derived will likewise be present.

In current forks for fork lift vehicles, the upper or top hook is welded to the upper end of the shank of the fork and a bottom hook is provided which is of a form adapted to engage with the vehicle in such a manner as to maintain the entire fork in position to prevent displacement from the vehicle and at the same time permit positioning of the fork along the face of the vehicle on a carriage which is provided, in all cases that are common herein.

The prior art fails to reveal any hook arrangement such as disclosed herein, and therefore it is believed that the provision of the hook construction will materially advantage not only the rapidity with which a fork may be connected to and disconnected from a vehicle but at the same time provides certain safety factors which will be apparent as this description proceeds.

Examples of the prior art which fail to anticipate the concept, much less the structure, are the German Pat. No. 1,205,449 wherein a latch structure 7 retains an element separate from the latch itself, in position. If a knob 16 of that structure is actuated, it will not permit the fork to be removed. but only allows a separate Part 11 to be removed by sideward movement. Unless that separate action is effected by the operator, the fork cannot be removed because it is retained n front of the upstanding portion of part 7. part 11 is a loose piece and is only moved by an operator or other person, and not by the mechanism itself.

Since the German patent does not provide anticipating structure, anything shown by U.S. Pat. No. 4,482,286 of Farmer, will not provide anticipating structure either, particularly when it is noted that Farmer does not even contemplate release or connection to an L-shaped fork. Farmer shows only a pushing arrangement for material supported on a platen tongue which has no relation to an L-shaped fork as in the instant disclosure.

Other patents in the prior art such as those of Cushman U.S. Pat. No. 2,581,364, the Austrian Pat. No. 188,651 and French Pat. No. 1,168,509, while directed to fork lift Vehicle and related structure, do not contemplate a releasable latching structure such as is contemplated hereby.

It is a primary object therefore of this invention to provide a fork construction which may be in placed upon and removed from the carriage of a fork lift vehicle without the necessity for the individual who is operating the vehicle to manhandle the fork into a position which would otherwise be necessary except for the provision of the hook construction hereof.

A further object of the invention is to enable the fork to be rapidly placed upon and removed from such a carriage so that the individual who operates the same is not required to dismount from the vehicle initially to connect the fork with the vehicle nor is its subsequent manipulation of the fork required as by main force because of the arrangement of the hook which is provided hereby.

Other and further objects of the invention will be understood from a consideration of the specification appended hereto and disclosed in the drawing wherein:

FIG. 1. is a somewhat diagrammatic side view, partly fragmentary to illustrate the various elements of the fork lift truck construction together with the usual attitude and arrangement of the fork or forks in connection therewith.

DESCRIPTION OF THE INVENTION

Figure 1:
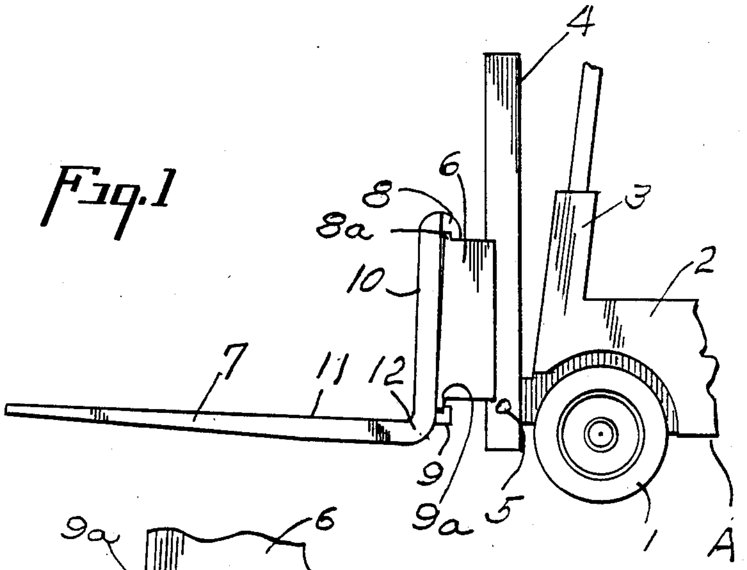

Referring now to FIG. 1, the usual fork lift truck designated A is provided with suitable wheel supports such as 1 there being two of these as will be readily understood and the body construction of the truck is designated 2 with an upright member such as 3 being provided to which is connected a mast 4 for rocking movement around a pivot 5 mounted on the truck and to which the mast is connected.

Moveable upwardly and downwardly on the mast is a carriage 6 to which is connected the fork or forks such as generally designated 7.

The fork 7 includes a top hook 8 and a bottom hook 9 not shown in detail in this particular figure, but described otherwise in the description hereof, as the same relates to the fork construction in general, the fork involving the use of a shank such as 10 to which the blade 11 is connected by a heel structure such as 12, the heel structure 12 being the position near which the bottom hook 9 which is the subject of this invention is positioned and to which it is connected.

Figure 3:
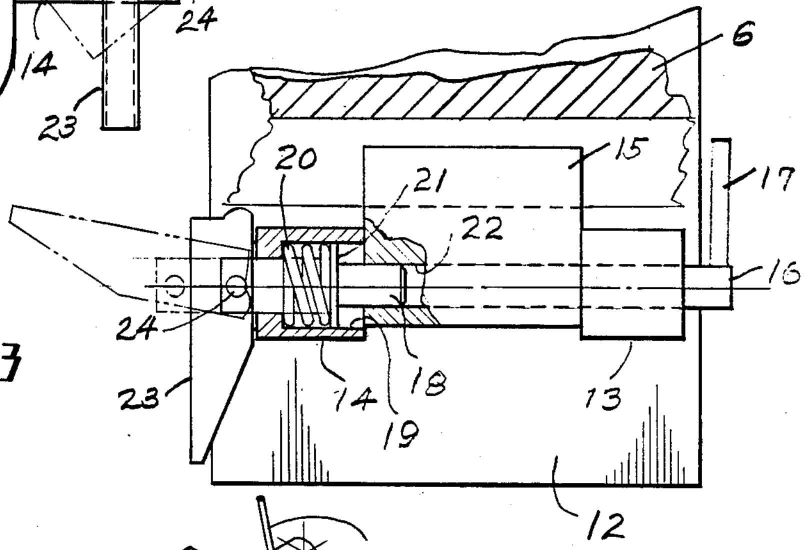
FIG. 3 is a rear view of the lock construction, partly in section and fragmentary to further illustrate the lock construction.

With the foregoing in mind and turning to the other figures in the drawing, it will be noted that in FIG. 3 a pair of spaced apart mounting blocks 13 and 14 are provided, these being of generally the similar exterior configuration, but the mounting block 14 being specially constructed for purposes which will be understood.

The mounting blocks 13 and 14 provide for pivotal mounting of a lock element such as is disclosed in FIG.

4 and designated 15 which is of special construction and configuration so that it may be mounted upon an axle such as 16 by provision of a suitable opening in the lock element 15 as will be readily understood and to which the axle is fastened to enable movement of the lock element by rotation of the axle.

Figure 2:
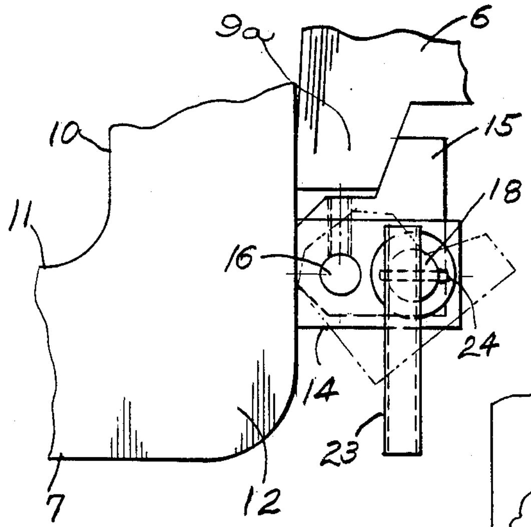
FIG. 2 is a fragmentary view showing the lock construction which is the basic improvement provided hereby.

The axle being mounted in the mounting blocks as suggested in FIG. 3 and of course in FIG. 2 as being positioned parallel with the heel section of the fork, so that the lock element may be rotated in said mounting blocks in the manner to be described and maintained in the various positions as will be understood.

Figure 4:
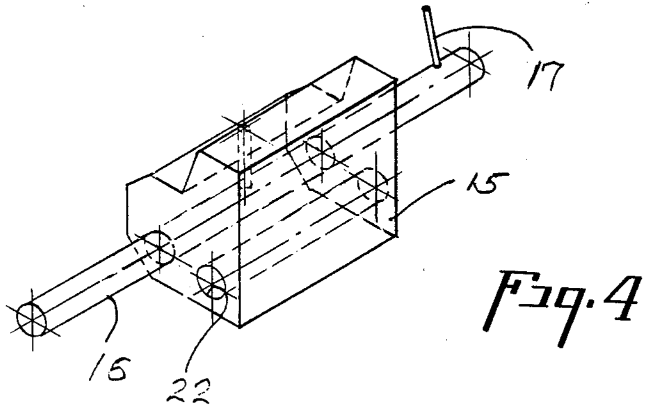
FIG. 4 is a perspective view of the lock element involved in the construction.

Referring to FIG. 3 again, the lock element 15 and additional reference may be had to FIG. 4, is so constructed as to normally tend to rotate as viewed in FIG. 2 in a clockwise direction by the arrangement of the weight of the element itself to effect such normal tendency.

In other words, it is sort of an over balanced arrangement which would normally move the lock element into the dotted line position of FIG. 2 if there were no other means to maintain the same in the upright position shown in such figure in solid line.

It should be noted that the respective hooks top and bottom 8 and 9 are intended to engage with a corresponding top rail 8*a* and bottom rail 9*a*, so as to maintain the fork in its connected relationship with the vehicle.

The rails 8*a* and 9*a* are provided in order to permit the transverse movement of the forks thereon into the position desired by reason of the equipment being picked up or positioned by the use of the forks as they are used in their normal course of operation.

It will be of course understood that the carriage 6 is moved upwardly and downwardly on the mast 4 so as to in turn carry the forks upwardly and downwardly as they are used in the course of their normal operation.

In view of the fact that the lock element 15 is normally in a condition which by gravity moves the same into the dotted line position of FIG. 2, it is desirable to provide means to engage the lock element with the rail 9*a*, and that involves a lock lever 17 which is connected at the end of the axle 16 and will thereby cause the same to move when impinged by some part of the truck or in any manner suitable for that purpose.

In this instance impingement of the rail 9*a* against the part 17 being the lock lever, will cause rotation of the lock element 15 in view of the fixing of the lock 15 on that axle 16.

Thus when the vehicle is operated so that the rail 9*a* for example impinges against the lever 17, the lock element 15 will be moved into the locked position shown in FIG. 2.

In order to maintain this lock element 15 in its locked position, a suitable latch means is provided and shown in some detail in the figures, as including a spring pressed plunger 18 which is moveable within the mounting block 14, which is equipped in turn with a suitable enlarged opening 19 therein to receive a spring 20, which spring 20 is arranged to press against a shoulder 21 fixed to the plunger 18.

Thus the spring 20 will normally cause the plunger 18 to move rightwardly as viewed in FIG. 3, and since a mating opening is provided and designated 22 in the lock element 15, when the lock element is in the proper position this plunger 18 will enter the said opening 22. It is thus normally maintained in that position as long as there is nothing to prevent the same and as long as that lock element 15 is in its proper upright locking condition.

In order to remove the fork from the engaged position such as is shown in FIG. 2, a suitable latch lever designated 23 may be manipulated, since it is connected at a pivot point 24 to the plunger 18, and so constructed that upon clockwise movement of the lever around the pivot 24 will directly withdraw the plunger 18 from its engaged position in the opening 22 in the latch element 15, and instantly permit direct release of the fork from the carrier.

This is illustrated by the dotted line position of the lever 23 as shown in FIG. 3.

It will be apparent that this will cause compression of the spring 20 and since the end 25 of the lever 23 is arranged to maintain the lever in the dotted line position of FIG. 3, rotation of the lever into the full line position of FIG. 3 will permit the plunger 18 to enter the opening 22 in the lock element 15 again when the lock lever 17 is impinged as previously explained by the rail such as 9*a* of the carriage previously mentioned.

Thus it is possible and desirable to arrange the various parts hereinbefore described so that normally when the latch means is operated so as to withdraw the plunger from its locking position, the lock element will thereby by gravity move into the dotted line position of FIG. 2 at 15 and then the operator of the machine may by suitable manipulation of the carriage cause the fork to be picked up properly by hooking the top hook on the top rail of the carriage and by suitable manipulation of the mast position the shank against the carriage and bring the hook construction previously disclosed in detail, and designated the bottom hook 9, so that the rail 9*a* will impinge the levers 17 and move the lock element into lock position, the plunger 18 thereby entering the corresponding opening 22 in that element and thus maintaining it in its lock condition.

Obviously suitable withdrawal operation of the lever 23 will remove the plunger from its position and permit disengagement of the bottom hook hereof at the convenience of the operator.

I claim:

1. A removable fork for a fork lift truck comprising a blade, a shank connected integrally thereto by a heel, said shank having a top hook for engaging the upper side of a carriage mounted on such truck and bottom hook means including mounting parts therefor extending rearwardly adjacent the heel of the fork, a hook lock element fixed to an axle and movably mounted on said mounting parts to engage a bottom side of the carriage; latch means comprising a plunger member normally biased to a position to maintain the hook lock element in a locked and carriage engaging positon and having a pivoted camming lever at its free end to withdraw the plunger against the bias into an unlocked and a carriage disengaging position so that the hook lock element gravitationally disengages from the carriage to facilitate removal of the fork from the truck; and an operating lever being connected to the axle to move the lock element into the locked position and being oprated by engagement by the downward movement of the carriage thereagainst.

* * * * *